(12) United States Patent
Buchko

(10) Patent No.: US 8,042,321 B2
(45) Date of Patent: Oct. 25, 2011

(54) MAGNETIC CONNECTION OF DRIVING AND DRIVEN CONNECTION FOR A REEL MOWER

(76) Inventor: Jeffrey Buchko, Clover, SC (US)

( * ) Notice: Subject to any disclaimer, the term of this patent is extended or adjusted under 35 U.S.C. 154(b) by 710 days.

(21) Appl. No.: 12/095,678

(22) PCT Filed: Oct. 2, 2006

(86) PCT No.: PCT/CA2006/001615
§ 371 (c)(1),
(2), (4) Date: May 30, 2008

(87) PCT Pub. No.: WO2007/038857
PCT Pub. Date: Apr. 12, 2007

(65) Prior Publication Data
US 2010/0269471 A1    Oct. 28, 2010

(51) Int. Cl.
*A01D 69/08*    (2006.01)
*A01D 34/53*    (2006.01)

(52) U.S. Cl. .......................................... 56/11.7; 56/249

(58) Field of Classification Search .......... 56/6, 7, 56/10.2 R, 10.2, 10.3, 11.7, 11.8, 12.7, 13.6, 56/16.7, 249, 249.5, 250–254, 294, 320.1, 56/DIG. 6

See application file for complete search history.

(56) References Cited

U.S. PATENT DOCUMENTS

| | | | | |
|---|---|---|---|---|
| 220,120 A * | 9/1879 | Burt | .......... | 56/253 |
| 638,262 A * | 12/1899 | McGuire | .......... | 384/538 |
| 1,347,569 A * | 7/1920 | Worthington | .......... | 56/7 |
| 1,775,500 A * | 9/1930 | Rowe | .......... | 56/294 |
| 1,836,164 A * | 12/1931 | Gratiot | .......... | 56/253 |
| 1,836,386 A * | 12/1931 | Nichols et al. | .......... | 56/294 |
| 1,984,966 A * | 12/1934 | Dohm | .......... | 56/294 |
| 2,208,577 A * | 7/1940 | Gillan | .......... | 56/294 |
| 2,300,712 A * | 11/1942 | Starkey | .......... | 56/294 |
| 2,646,658 A * | 7/1953 | Dunham | .......... | 56/249 |
| 2,821,277 A * | 1/1958 | Hughes | .......... | 192/69.91 |
| 2,885,873 A * | 5/1959 | Beeston, Jr. | .......... | 464/29 |
| 4,680,922 A | 7/1987 | Arnold | | |
| 5,291,724 A | 3/1994 | Cotton | | |
| 5,412,932 A * | 5/1995 | Schueler | .......... | 56/249 |
| 5,829,235 A | 11/1998 | Rice et al. | | |
| 5,896,734 A * | 4/1999 | Chesack et al. | .......... | 56/249 |
| 5,941,057 A * | 8/1999 | Chesack et al. | .......... | 56/249 |
| 6,318,059 B1 | 11/2001 | Cotton | | |
| 6,434,894 B2 * | 8/2002 | Reymann | .......... | 52/127.7 |
| 6,487,837 B1 | 12/2002 | Fillman et al. | | |
| 6,889,491 B2 | 5/2005 | Buchko | | |
| 6,946,762 B2 | 9/2005 | Rinholm et al. | | |
| 7,228,593 B2 * | 6/2007 | Conrad | .......... | 15/390 |
| 2002/0157370 A1 * | 10/2002 | Beckman et al. | .......... | 56/249 |
| 2003/0145570 A1 * | 8/2003 | Berndt et al. | .......... | 56/6 |
| 2003/0196294 A1 * | 10/2003 | Conrad | .......... | 15/331 |
| 2007/0144129 A1 * | 6/2007 | Daly | .......... | 56/11.9 |
| 2007/0170346 A1 * | 7/2007 | Vappula | .......... | 249/139 |

* cited by examiner

*Primary Examiner* — Thomas Will
*Assistant Examiner* — Joan Misa
(74) *Attorney, Agent, or Firm* — Trego, Hines & Ladenheim, PLLC

(57) ABSTRACT

A rotating mechanical apparatus, such as would be used in a reel mower assembly, comprises a drive member rotatably mounted in a frame about a shaft axis. The drive member has a drive face oriented perpendicular to the shaft axis. A driven member has a driven shaft rotatably supported in the frame about the shaft axis, and a driven face oriented parallel to and bearing against the drive face. A bulb extends outward from one of the drive face and the driven face and into a corresponding recess in the other. Magnets force the drive face to bear against the driven face such that the driven shaft rotates with the drive member. One of the drive face and the driven face are movable along the shaft axis to disengage the bulb from the recess. A height adjustment mechanism moves ground rollers closer together or farther apart to vary cutting height.

8 Claims, 3 Drawing Sheets

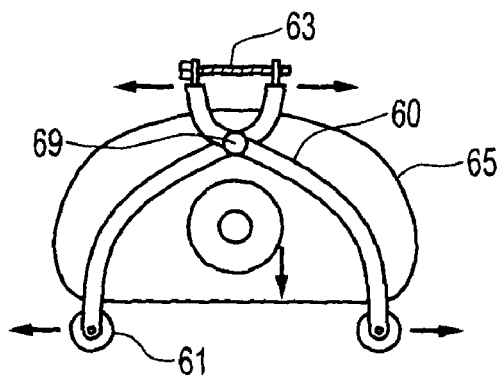
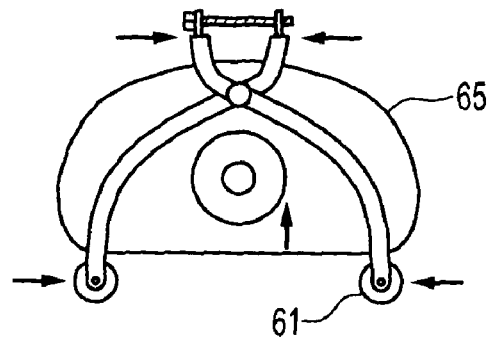
FIG. 9    FIG. 10
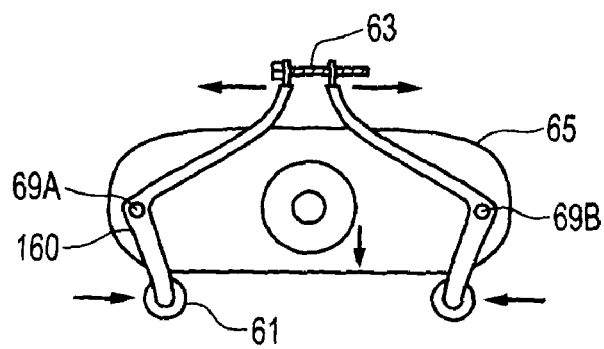
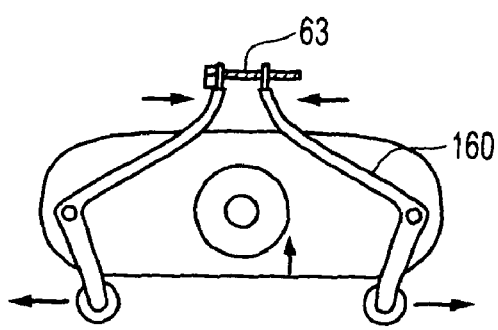
FIG. 11    FIG. 12

MAGNETIC CONNECTION OF DRIVING AND DRIVEN CONNECTION FOR A REEL MOWER

This invention is in the field of driving shafts and in particular driving shafts for mower reels and the like via a magnetic connection.

BACKGROUND

Reel mowers use a scissoring action to shear grass and like foliage, rather than tearing the leaves as with a conventional rotary mower. Because the shearing action leaves a neatly cut top end to the grass, compared to the torn end common with rotary cutters, the grass has an improved appearance. Such reel mowers are more expensive and require more maintenance than rotary mowers, however they are preferred by golf courses and the like where appearance and healthy grass are important. Individual reel mower assemblies are quite narrow, and consequently reel mower units commonly comprise a plurality of side-by-side reel mower assemblies.

Examples of such mowers are disclosed in U.S. Pat. Nos. 5,291,724, 5,477,666 and 6,318,059 to Cotton. In a typical reel mower assembly, the mower frame comprises fixed side plates and an attachment member, commonly called a bed bar, fixed to the frame and extending from one side of the frame to the other. A replaceable bed knife is attached to the bed bar, and a reel head with helical knives mounted thereon is rotatably mounted in each side plate of the frame and extends across the mower assembly above the bed knife. The reel head and bed knife are oriented such that the bed knife is parallel to the reel axis and in close proximity to the reel knives as the reel head rotates so that a shearing action is achieved between the reel knives and the bed knife. Typically an adjustment mechanism is provided to allow movement of the bed bar relative to the reel head so that the bed knife can be moved into proper relationship with the rotating reel knives.

Height of cut control is also provided to maintain the bed knife at a constant vertical position with respect to the grass so that the cut grass is substantially all the same height. Typically front and rear ground rollers are rotatably mounted in each side plate of the frame and extend across the assembly, one forward of the bed knife and one rearward. The ground rollers are lower than the bed knife and support the assembly as it rolls across the ground. The ground rollers can be moved up and down to adjust the vertical position of the bed knife with respect to the ground and thus the cutting height.

Conventionally the reel head comprises a shaft extending through bearings in each side plate of the frame. A drive sprocket, pulley, or the like is attached to one end of the shaft outside the side plate, and a chain, belt, or like drive mechanism is connected to rotate the reel. Removing the reel head for replacement or repair thus requires considerable disassembly, such as removal of bearings, pulleys, and the like from the shaft to allow removal of the reel.

The reel head is also susceptible to damage when a rock or like object becomes jammed between the bed knife and one of the reel knives, since conventionally the reel head and bed knife are fixed to the frame, and so neither can move in response to the force of a jammed object.

U.S. Pat. No. 6,889,491 to the present inventor Buchko discloses a magnetic bed knife attachment to facilitate removal and replacement of the bed knife. Instead of a plurality screws, the bed knife is attached to the bed bar with magnets such that same can be readily removed for sharpening, repair, replacement, and like maintenance. Also, where the force exerted by a jammed rock or like obstruction is sufficient, the bed knife of Buchko will be forced away from the bed bar, thus avoiding or at least reduce damage to the bed knife and the reel knives. Damage to the reel head can still occur however if, for example, the object jams between the bed bar, which is still rigidly attached to the frame, and the reel knives.

SUMMARY OF THE INVENTION

It is an object of the present invention to provide a shaft drive apparatus for reel mowers and like machines that overcomes problems in the prior art. The invention can also provide a vertical adjustment apparatus for a reel mower assembly that overcomes problems in the prior art.

In a first embodiment the present invention provides a reel mower apparatus comprising a reel mower frame, and a drive member rotatably mounted in a first side of the reel mower frame about a shaft axis, the drive member having a drive face oriented substantially perpendicular to the shaft axis. A drive mechanism is operative to rotate the drive member about the shaft axis. A mower reel head has a reel shaft rotatably supported at a second end thereof in a second side of the reel mower frame such that the reel shaft rotates about the shaft axis, and a reel member attached at a first end of the reel shaft has a reel face oriented substantially parallel to and bearing against the drive face. A centering bulb extends outward from one of the drive face and the reel face and into a corresponding centering recess in the other of the drive face and the reel face. The centering bulb and recess are configured to be symmetrical about the shaft axis such that the drive member and reel member can rotate about the shaft axis with respect to each other. A plurality of magnets are operative to exert a magnetic force forcing the drive face to bear against the reel face such that the reel shaft rotates with the drive member, and at least one of the drive face and the reel face is movable along the shaft axis to disengage the centering bulb from the centering recess.

In a second embodiment the present invention provides a rotating mechanical apparatus comprising a frame and a drive member rotatably mounted in a first side of the frame about a shaft axis, the drive member having a drive face oriented substantially perpendicular to the shaft axis. A drive mechanism is operative to rotate the drive member about the shaft axis. A driven member has a driven shaft rotatably supported at a second end thereof in a second side of the frame such that the driven shaft rotates about the shaft axis, and a driven face member is attached at a first end of the driven shaft and has a driven face oriented substantially parallel to and bearing against the drive face. A bulb extends outward from one of the drive face and the driven face and into a corresponding recess in the other of the drive face and the driven face. A plurality of magnets is operative to exert a magnetic force forcing the drive face to bear against the driven face such that the driven shaft rotates with the drive member. At least one of the drive face and the driven face is movable along the shaft axis to disengage the bulb from the recess.

In a third embodiment the present invention provides a vertical adjustment apparatus for a reel mower assembly. The apparatus comprises a front ground roller mounted on front roller linkage arms configured such that the front ground roller extends laterally across a path of the mower assembly forward of a blade of the mower assembly, and a rear ground roller mounted on rear roller linkage arms configured such that the rear ground roller extends laterally across a path of the mower assembly rearward of the blade of the mower assembly. The reel mower assembly is supported on the front and rear ground rollers such that a vertical position of the ground rollers with respect to the blade sets a cutting height, and the front and rear roller linkage arms are linked by an adjustment link, and the adjustment link can be manipulated to move the front and rear ground rollers closer together or farther apart. The roller arms are configured such that as the ground rollers move closer together or farther apart the cutting height changes.

In a typical embodiment the reel mower frame comprises right and left side plates, each defining shaft apertures therethrough. A stub shaft is rotatably mounted to one side plate and an outer end of the stub shaft is adapted to be rotated about a shaft axis by a drive mechanism. A drive member is attached to the inner end of the stub and comprises a drive face oriented perpendicular to the shaft axis, and a plurality of drive magnets with a first polarity are mounted on the drive face such that faces of the drive magnets are substantially parallel to and flush with the drive face. The drive member is slidable along the shaft axis.

The reel shaft of a mower reel head is rotatably supported at an outer end thereof in the opposite side plate and a reel member attached at an inner end of the reel shaft has a reel face parallel to the drive face, and a plurality of reel magnets with a second polarity opposite the first polarity are mounted on the reel face such that faces of the reel magnets are substantially parallel to and flush with the reel face. The reel magnets and drive magnets are substantially evenly spaced about the corresponding reel and drive faces such that when the reel shaft and stub shaft are aligned on the shaft axis, each reel magnet is aligned with a corresponding drive magnet, and the corresponding reel and drive magnets are attracted to each other.

A bulb extends outward from one of the drive and the reel faces, and into a corresponding recess in the other of the reel and drive faces. Engaging the bulb in the recess aligns the drive and driven members on the shaft axis. To provide a slip clutch between the drive and driven members, the bulb and recess can be configured as a centering bulb and recess that are symmetrical about the shaft axis such that when the centering bulb is engaged in the centering recess the drive face can rotate with respect to the reel face.

With the outer end of the reel shaft engaged in the opposite side plate and the reel shaft aligned with the shaft axis the drive member is moved along the shaft axis toward the reel member such that the centering bulb engages the centering recess, and the drive magnets are aligned with and in contact with the reel magnets to form a magnetic connection between the drive member and reel member.

When an obstruction is encountered, the magnetic force holding the reel face to the drive face will be insufficient to maintain the connection, and the reel member and reel will stop rotating while the drive face and drive member continue to rotate, while both are maintained in alignment by the centering bulb rotating in the centering recess. Damage to the mower from such obstructions is thus reduced A mechanism can be provided to force the drive face along the shaft axis away from the reel face to break the magnetic connection when it is desired to remove the reel head. It is contemplated that providing a magnetic connection on both ends of the reel shaft will better provide for convenient removal and installation, and provide the added benefit of providing the option to drive the reel head from either side such that configuring larger mower units with a considerable number of individual mower assemblies will be more readily accomplished. An embodiment is also disclosed that includes a magnetic connection on only one end of the reel head.

Vertical adjustment of the mower assembly with respect to the ground is provided by a linkage connecting the front and rear ground rollers of the assembly. A single screw controls the linkage to move the rollers closer together or further apart to adjust the vertical position of the mower assembly with respect to the ground. In one version of the linkage the front and rear rollers are moved closer together to move the mower assembly down closer to the ground. With the front and rear rollers closer together at the lower positions, more precise vertical control of the mower assembly is provided. Scalping of a grassed area occurs when the bed blade of the mower assembly contacts the ground during use, typically because the front and rear ground rollers pass over a hump in the ground and the front roller will be on one side of the hump and the rear roller on the opposite side with the hump extending upward between the rollers. When the vertical position of the mower assembly is set close to the ground to cut the grass short, the knife located between the front and rear rollers can contact the top of the hump. When the knife is adjusted higher for a longer cut, scalping seldom occurs. Moving the rollers closer together for a shorter cut thus reduces the distance between the rollers, and reduces the chance that a hump in the ground will extend upward between the front and rear rollers far enough to contact the knife.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIGS. 9 and 10 show a mower height adjustment linkage operated by a single screw where the rollers move apart as the mower assembly moves down;

FIGS. 11 and 12 show an alternate mower height adjustment linkage operated by a single screw where the rollers move together as the mower assembly moves down.

DETAILED DESCRIPTION OF THE ILLUSTRATED EMBODIMENTS

Figure 1:
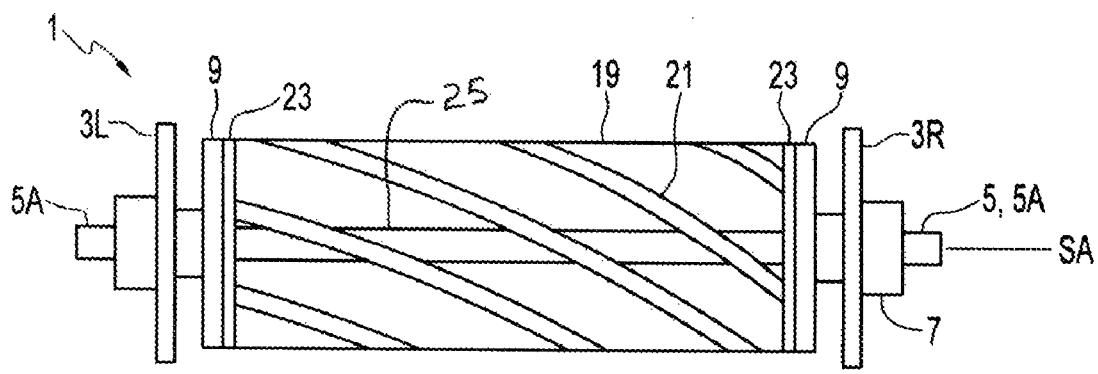
FIG. 1 is a schematic front view of an embodiment of the invention on a reel mower assembly with the magnetic connection connected.
Figure 2:
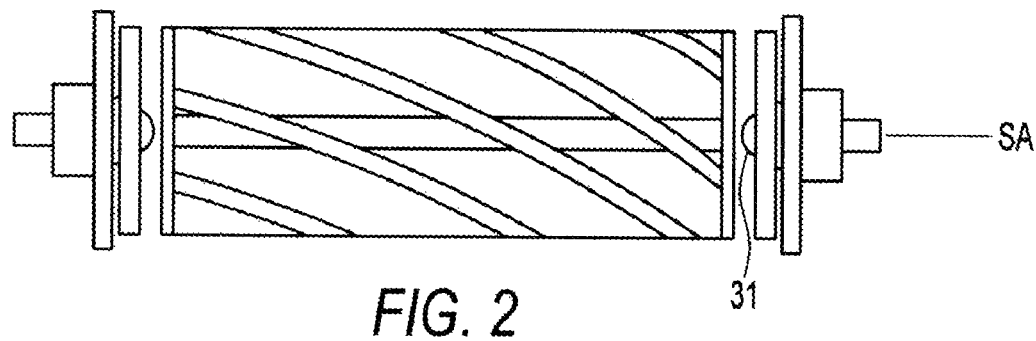
FIG. 2 is a schematic front view of the embodiment of FIG. 1 with the magnetic connection disconnected.

FIGS. 1 and 2 schematically illustrate a reel mower assembly 1 comprising a frame with right and left side plates 3R, 3L, each defining shaft apertures therethrough. A bearing housing 7 is mounted over the shaft aperture in each side plate 3R, 3L, and a stub shaft 5 extends through the bearing housing 7 and shaft aperture, and engages a bearing mounted in the bearing housing such that the bearing and stub shaft rotate together, and such that the stub shaft 5 is supported substantially in alignment with a shaft axis SA. An outer end 5A of the stub shaft 5 is located outside the frame side plates 3R, 3L and is adapted to be rotated about the shaft axis SA by a drive mechanism. A belt pulley, chain, sprocket, gear, or the like is attached to the outer end SA of one of the stub shafts 5, and is driven conventionally.

Figure 5:
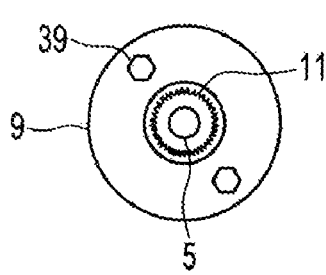
FIG. 5 is a schematic right view of the drive member of the embodiment of FIG. 1.
Figure 6:
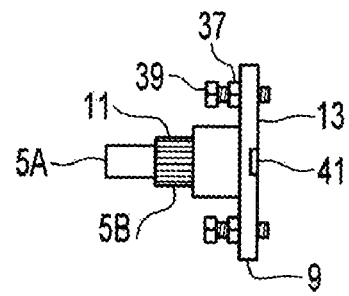
FIG. 6 is a schematic front view of the drive member of the embodiment of FIG. 1.

The inner end 5B of each stub shaft 5, as seen in FIG. 6, is located between the right and 20 left side plates 3R, 3L, and a drive member 9 is attached to the inner end 5B of each stub shaft 5 such that the drive member 9 and stub shaft 5 rotate together, and such that the drive member 9 can move along the shaft axis SA toward or away from the bearing housing 7. In the illustrated embodiment, the stub shafts 5 are splined, as seen in FIGS. 5 and 6, and the drive member 9 engages the splines 11 to rotate with the stub shaft 5 and yet can also move with respect to the stub shaft 5 along the shaft axis SA. Alternatively the drive member 9 could be fixed to the stub shaft 5, and the stub shaft 5 could move along the shaft axis through the bearing in the bearing housing 7. Those skilled in the art will readily recognize other configurations that could provide the required sliding movement of the drive member 9 along the shaft axis SA. The drive member 9 could also be fixed along the shaft axis SA, as in a further alternative embodiment described below.

Figure 3:
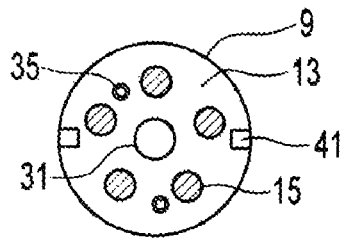
FIG. 3 is a schematic left side view of the drive member of the embodiment of FIG. 1.

Each drive member 9, as seen in FIG. 3 comprises a drive face 13 oriented perpendicular to the shaft axis SA, and a plurality of drive magnets 15 with a first polarity are mounted on the drive face 13 such that faces of the drive magnets 15 are substantially parallel to and flush with the drive face 13.

Figure 4:
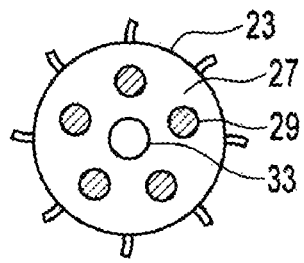
FIG. 4 is a schematic right side view of the reel member of the embodiment of FIG. 1.

The reel head 19 comprises a plurality of helical reel knives 21 attached to a reel member 23 at each end. The reel members 23 are fixed to a reel shaft 25 at each end of the reel head 19 adjacent to the drive members 9. Each reel member 23 has a reel face 27, as seen in FIG. 4 that is parallel to the drive face 13 of the drive member 9. A plurality of reel magnets 29 with a second polarity opposite the first polarity are mounted on the reel face 27 such that faces of the reel magnets 29 are substantially parallel to and flush with the reel face 27. The reel magnets 29 and drive magnets 15 are substantially evenly spaced about the corresponding reel and drive faces 13, 27 such that when the reel shaft 25 and stub shaft 5 are aligned on the shaft axis SA, each reel magnet 29 is aligned with a corresponding drive magnet 15, and the corresponding reel and drive magnets 15, 29 are attracted to each other and form a magnetic connection.

To facilitate aligning the reel and stub shafts 25, 5 on the shaft axis SA, and to maintain the alignment during operation, a centering bulb 31 extends outward from the face 13, and into a corresponding centering recess 33 in the reel face 27. The centering bulb 31 and recess 33 are symmetrical about the shaft axis SA such that when the bulb 31 is engaged in the recess 33, the reel shaft 25 and stub shaft 5 are aligned on the shaft axis SA and can rotate with respect to each other.

To install the reel head 19 in the side plates 3R, 3L of the frame, the drive members 9 are moved along the shaft axis SA toward the bearing housings 7 in each side plate 3R, 3L to make room for the reel head 19 to be installed, as seen in FIG. 2. The drive members 9 are then moved along the shaft axis SA toward the reel members 23 such that the centering bulbs 31 engage the centering recesses 33, and the drive magnets 15 are aligned with the reel magnets 29. It is contemplated that once the reel face 27 and drive face 13 are in proximity to each other the magnets 15, 29 will attract each other and the reel member 23 will rotate such that the reel magnets 29 move into alignment with the drive magnets 15.

Providing two magnets with opposite polarities increases the forces drawing the reel face 27 against the drive face 13 compared to a magnet attracted to a steel face alone. Commercial grade magnets are available that will provide sufficient attraction to allow transmission through the magnetic connection of sufficient power to drive a mower reel or like device. Thus the magnetic connection facilitates fast installation and removal of the reel head 19 from the reel mower assembly 1, and as well when an obstruction is encountered, the force magnetic connection will be released when the drive force is sufficient to overcome the attractive force of the magnetic connection, and the drive member 9 that is connected to the mower drive will spin while the reel head is prevented from spinning by the obstruction. The magnetic connection thus provides a slip clutch that will reduce damage from an obstruction such as a rock or the like.

A pin through the stub shaft 5, or like lock mechanism, could be provided to prevent the drive member 9 from sliding along the stub shaft 5 and disengaging the centering bulb 31 from the centering recess 33 when an obstruction is encountered and the magnetic connection slips. Alternatively it may be desired to allow the drive member 9 to slide back and disengage the bulb 31 from the recess 33 to allow the reel head 19 to pop out of alignment with the shaft axis SA, and further reduce damage.

It is contemplated that some mechanism will need to be provided to break the magnetic connection by forcing the drive face 13 away from the reel face 27 when it is desired to remove the reel head 19. Threaded apertures can be provided in one of the faces 13, 27 for example by welding a nut 37 over a hole 35 in the drive member 9, as illustrated in FIGS. 3, 5, 6, such that a bolt 39 can be threaded into the nut 37 and the inner end of the bolt will bear against the opposite reel face 27 and force the faces 13, 27 apart, breaking the magnetic connection and allowing the drive member 9 to slide back along the stub shaft 5 to release the reel head 19.

Alternatively or in addition, grooves 41 could be provided in the edges of one of the faces, such as the drive member 9 illustrated in FIGS. 3 and 6, to allow a pry bar to be inserted between the faces 13, 27 to pry the faces apart. Those skilled in the art will recognize other mechanisms suitable for applying the necessary force to break the magnetic connection.

Figure 7:
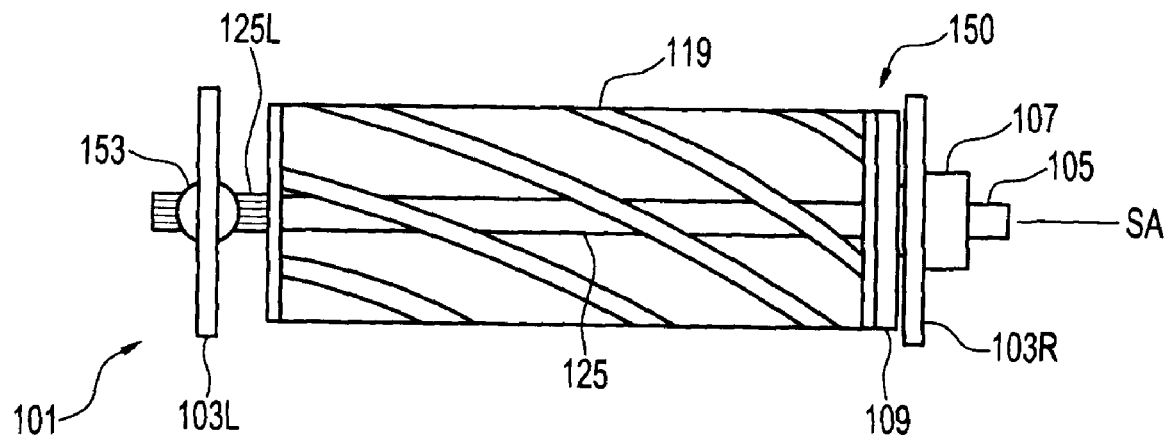
FIG. 7 is a schematic front view of an alternate embodiment of the invention on a reel mower assembly with the magnetic connection connected.
Figure 8:
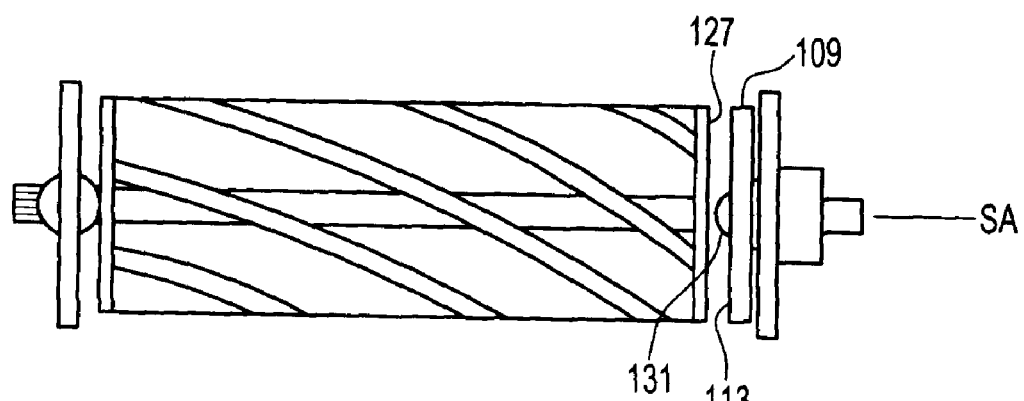
FIG. 8 is a schematic front view of the embodiment of FIG. 7 with the magnetic connection disconnected.

The illustrated embodiment of FIGS. 1 and 2 shows a magnetic connection at each end of the reel head 17. It is contemplated that an alternate embodiment of a reel mower assembly 101 could be provided as illustrated in FIGS. 7 and 8, where a magnetic connection apparatus 150 is provided at only the right side plate 103R, and the drive member 109 thereof is fixed to the stub shaft 105 which is fixed in place relative to the bearing housing 107. Thus the drive member 109 in this embodiment doesn't move, but instead the reel head 119 is movable along the shaft axis SA. The left end 125L of the reel shaft 125 is splined and engages a correspondingly splined swivel mounted bearing 153 in the left side plate 103L.

To install the reel shaft 125 in the side plate 103L of the frame, left end 125L of the reel shaft 125 is engaged in the bearing 153 which is swiveled to orient the shaft hole thereof at an angle. The reel shaft 125 is then inserted on an angle, and when fully inserted can be moved down into alignment with the shaft axis SA with the reel face 127 adjacent to the drive face 113 of the drive member 109 and then moved toward the drive member 109 to engage the centering bulb 131 in the recess in the reel face 127. To remove the reel head 119 the magnetic connection is broken as described above, and the reel shaft moved to the left and then up as illustrated by the arrow in FIG. 8.

The quick change features of the magnetic connection of the invention allow adaptation of the frame to accommodate other mechanisms in place of the reel head. For example a mower assembly could quickly be converted to a rotary boom assembly by substituting a suitably configured broom head for the reel head illustrated.

It is contemplated that the magnetic connection could be used as well in other shaft drive applications where removal of the driven element is desirable.

Vertical adjustment of the mower assembly with respect to the ground is provided by linkage arms 60, 160 connecting the front and rear ground rollers 61 of the assembly as illustrated in FIGS. 9-12. An adjustment link, provided in the illustrated embodiment by a single screw 63, controls the linkage arms to move the rollers 61 closer together or further apart to adjust the vertical position of the mower assembly 65 with respect to the ground.

In the embodiment of FIGS. 9 and 10, the linkage arms 60 are configured such that when screw 63 is turned to push the upper portions of the linkage arms 60 apart, the lower portions of the linkage arms 60 also move apart and the rollers 65 rotatably attached to the lower ends move away from each other, such that the pivot point 69 and the mower assembly 65 move down closer to the ground, reducing the cutting height. Turning the screw 63 to pull the upper portions of the linkage arms 67 together, moves the lower portions of the linkage arms 67 together and the rollers 65 move toward each other, such that the pivot point 69 and the mower assembly 65 move up and away from the ground, increasing the cutting height and the length of the cut grass.

In contrast, in the embodiment of FIGS. 11 and 12, by locating front and rear pivot points 69A, 69B forward and rearward of the rollers 61, instead of providing a single pivot point 69 between the rollers 61 as in the embodiment of FIGS. 9 and 10, the linkage arms 160 are configured such that the front and rear rollers 61 are moved closer together to move the mower assembly 65 down closer to the ground. With the front and rear rollers 61 closer together at the lower positions, more precise vertical control of the mower assembly is provided.

Scalping of a grassed area occurs when the bed blade of the mower assembly 65 contacts the ground during use, typically because the front and rear ground rollers 61 pass over a hump in the ground and the front roller will be on one side of the hump and the rear roller on the opposite side with the hump extending upward between the rollers 61. When the vertical position of the mower assembly is set close to the ground to cut the grass short, the knife located between the front and rear rollers 61 can contact the top of the hump. When the knife is adjusted higher for a longer cut, scalping seldom occurs. Moving the rollers 61 closer together for a shorter cut thus reduces the distance between the rollers 61, and reduces the chance that a hump in the ground will extend upward between the front and rear rollers far enough to contact the knife.

Thus the foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A reel mower apparatus comprising:
   a reel mower frame;
   a drive member rotatably mounted in a first side of the reel mower frame about a shaft axis, the drive member having a drive face oriented substantially perpendicular to the shaft axis;
   a drive mechanism operative to rotate the drive member about the shaft axis;
   a mower reel head having a reel shaft rotatably supported at a second end thereof in a second side of the reel mower frame such that the reel shaft rotates about the shaft axis;
   a reel member attached at a first end of the reel shaft and having a reel face oriented substantially parallel to and bearing against the drive face;
   a centering bulb extending outward from one of the drive face and the reel face and into a corresponding centering recess in the other of the drive face and the reel face, the centering bulb and recess configured to be symmetrical about the shaft axis such that the drive member and reel member can rotate about the shaft axis with respect to each other; and
   a plurality of magnets operative to exert a magnetic force forcing the drive face to bear against the reel face such that the reel shaft rotates with the drive member;
   wherein, in response to a force encountered during operation that is opposite to the magnetic force and greater than the magnetic force, at least one of the drive face and the reel face is movable along the shaft axis to disengage the centering bulb from the centering recess and allow the reel shaft to move out of alignment with the shaft axis.

2. The apparatus of claim 1 wherein at least one magnet of said plurality of magnets is mounted on one of the drive face and the reel face such that a face of the at least one magnet is substantially parallel to and flush with the corresponding one of the drive face and reel face.

3. The apparatus of claim 1 wherein said plurality of magnets comprise:
   a drive magnet with a first polarity mounted on the drive face such that a face of the drive magnet is substantially parallel to and flush with the drive face;
   a reel magnet with a second polarity mounted on the reel face such that a face of the reel magnet is substantially parallel to and flush with the reel face;
   wherein the drive face and reel face are configured such that faces of the drive magnet and the reel magnet substantially bear against each other.

4. The apparatus of claim 3 comprising a plurality of drive magnets and a corresponding plurality of reel magnets substantially evenly spaced about the corresponding drive and reel faces such that when the reel shaft and drive member are aligned on the shaft axis, each drive magnet is aligned with a corresponding reel magnet.

5. The apparatus of claim 1 wherein movement along the shaft axis of at least one of the drive face and the reel face is provided by slidably mounting at least one of the drive face and the reel face to a splined shaft, the splined shaft engaged in a corresponding splined bearing mounted to the reel mower frame.

6. The apparatus of claim 1 comprising a stub shaft rotatably mounted in the reel mower frame about the shaft axis, and wherein the drive member is slidably attached to an inner end of the stub shaft.

7. The apparatus of claim 1 wherein the reel shaft is rotatably supported at a second end thereof in a second side of the reel mower frame by a second reel member having a face magnetically forced to bear against a face of a second drive member rotatably mounted in the reel mower frame; and wherein the drive mechanism can be configured to rotate the drive member at either end of the mower reel head.

8. The apparatus of claim 1 comprising a threaded member operative when rotated to move the drive face and reel face away from each other by exerting a force thereon greater than the magnetic force to disengage the centering bulb from the centering recess.

* * * * *